US010882955B2

(12) United States Patent
Sorenson et al.

(10) Patent No.: US 10,882,955 B2
(45) Date of Patent: Jan. 5, 2021

(54) AMMONIUM SALT CATALYZED BENZOXAZINE POLYMERIZATION

(71) Applicant: 3M INNOVATIVE PROPERTIES COMPANY, St. Paul, MN (US)

(72) Inventors: Gregory P. Sorenson, Maplewood, MN (US); Ilya Gorodisher, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/574,882

(22) PCT Filed: May 13, 2016

(86) PCT No.: PCT/US2016/032425
§ 371 (c)(1),
(2) Date: Nov. 17, 2017

(87) PCT Pub. No.: WO2016/200557
PCT Pub. Date: Dec. 15, 2016

(65) Prior Publication Data
US 2018/0162999 A1    Jun. 14, 2018

Related U.S. Application Data

(60) Provisional application No. 62/172,957, filed on Jun. 9, 2015.

(51) Int. Cl.
C08L 79/04 (2006.01)
C08G 73/00 (2006.01)
C08G 73/06 (2006.01)
C08G 73/02 (2006.01)
C08G 14/06 (2006.01)
C08J 5/18 (2006.01)
C08L 63/00 (2006.01)

(52) U.S. Cl.
CPC ............ *C08G 73/06* (2013.01); *C08G 14/06* (2013.01); *C08G 73/0233* (2013.01); *C08J 5/18* (2013.01); *C08L 63/00* (2013.01); *C08L 79/04* (2013.01); *C08J 2379/04* (2013.01); *C08J 2479/04* (2013.01)

(58) Field of Classification Search
None
See application file for complete search history.

(56) References Cited

U.S. PATENT DOCUMENTS

| 3,018,262 | A | 1/1962 | Schroeder |
| 3,298,998 | A | 1/1967 | McConnell |
| 3,496,250 | A | 2/1970 | Czerwinski |
| 4,501,864 | A | 2/1985 | Higginbottom |
| 4,507,428 | A | 3/1985 | Higginbottom |
| 5,059,701 | A | 10/1991 | Keipert |
| 5,089,536 | A | 2/1992 | Palazzotto |
| 5,191,101 | A | 3/1993 | Palazzotto |
| 5,543,516 | A | 8/1996 | Ishida |
| 6,207,786 | B1 | 3/2001 | Ishida |
| 6,376,080 | B1 | 4/2002 | Gallo |
| 7,041,772 | B2 | 5/2006 | Aizawa |
| 7,053,138 | B2 | 5/2006 | Magendie |
| 7,517,925 | B2 | 4/2009 | Dershem |
| 2004/0147640 | A1* | 7/2004 | Hwang ............. C08G 59/304 523/400 |
| 2009/0274916 | A1* | 11/2009 | Takahashi ........... B32B 15/20 428/457 |
| 2009/0280331 | A1* | 11/2009 | Takahashi ........... B32B 15/20 428/416 |
| 2012/0010202 | A1* | 1/2012 | Taden ............... C07D 265/16 514/230.5 |
| 2012/0129414 | A1* | 5/2012 | Chang ................ C08K 3/22 442/175 |
| 2013/0061273 | A1 | 3/2013 | Reisman |
| 2013/0074248 | A1 | 3/2013 | Evans |
| 2014/0034863 | A1 | 2/2014 | Gilstad |

FOREIGN PATENT DOCUMENTS

| EP | 0094914 | 11/1983 |
| EP | 0094915 | 11/1983 |
| EP | 0126712 | 11/1984 |
| EP | 1400546 | 3/2004 |
| EP | 2314579 | 4/2011 |
| JP | 2000-086863 | 3/2000 |
| JP | 2002/212269 A | 7/2002 |
| WO | WO 2002-000757 | 1/2002 |
| WO | WO 2008-095837 | 8/2008 |
| WO | WO 2011-047929 | 4/2011 |
| WO | WO 2011-119180 | 9/2011 |
| WO | WO 2012-134731 | 10/2012 |
| WO | WO 2013-048851 | 4/2013 |
| WO | WO 2013-063236 | 5/2013 |

(Continued)

OTHER PUBLICATIONS

Andreu, "BF$_3$•OEt$_2$ in Alcoholic Media, An Efficient Initiator in the Cationic Polymerization of Phenyl-1,3-Benzoxazines", Journal of Polymer Science Part A: Polymer Chemistry, 2013, vol. 51, pp. 5075-5084.

Andreu, "Carboxylic Acid-Containing Benzoxazines as Efficient Catalysts in the Thermal Polymerization of Benzoxazines", Journal of Polymer Science Part A: Polymer Chemistry, 2008, vol. 46, No. 18, pp. 6091-6101, XP002578540.

Chutayothin, "Cationic Ring-Opening Polymerization of 1,3-Benzoxazines: Mechanistic Study Using Model Compounds", Macromolecules, 2010, vol. 43, No. 10, pp. 4562-4572.

Dunkers, "Reaction of Benzoxazine-Based Phenolic Resins with Strong and Weak Carboxylic Acids and Phenols as Catalysts", Journal of Polymer Science: Part A: Polymer Chemistry, 1999, vol. 37, pp. 1913-1921.

Eckert, "Prediction of Acidity in Acetonitrile Solution with COSMO-RS", Journal of Computational Chemistry, 2009, vol. 30, No. 05, pp. 799-810, XP055297222.

(Continued)

Primary Examiner — Michael J Feely

(57) ABSTRACT

A process of preparing polybenzoxazines using an alkylammonium salt of an acid having a pKa in acetonitrile of 9 or more as catalyst is described.

14 Claims, No Drawings

(56) References Cited

FOREIGN PATENT DOCUMENTS

| WO | WO 2013-119388 | 8/2013 |
|---|---|---|
| WO | WO 2014-105422 | 7/2014 |

OTHER PUBLICATIONS

Ghosh, "Polybenzoxazine-New High Performance Thermosetting Resins: Synthesis and Properties", Progress in Polymer Science, 2007, vol. 32, pp. 1344-1391.
Hamerton, "Examining the Initiation of the Polymerization Mechanism and Network Development in Aromatic Polybenzoxazines", Macromolecules, 2013, vol. 46, No. 13, pp. 5117-5132.
Kimura, "New Thermosetting Resin from Bisphenol A-based Benzoxazine and Bisoxazoline", Journal of Applied Polymer Science, 1999, vol. 72, pp. 1551-1558.
Kimura, "Studies on New Type of Phenolic Resin-Curing Reaction of Bisphenol-A-Based Benzoxazine with Epoxy Resin Using Latent Curing Agent and the Properties of the Cured Resin", Journal of Applied Polymer Science, 2008, vol. 109, pp. 1248-1256.
Kutt, "A Comprehensive Self-Consistent Spectrophotometric Acidity Scale of Neutral Bronsted Acids in Acetonitrile", The Journal of Organic Chemistry, 2006, vol. 71, No. 07, pp. 2829-2838, XP055053732.
Liu, "Catalyst Effects on the Ring-Opening Polymerization of 1,3-Benzoxazine and on The Polymer Structure", Polymer, 2013, vol. 54, pp. 2873-2878.
Liu, "Mechanistic Studies on Ring-Opening Polymerization of Benzoxazines: A Mechanistically Based Catalyst Design", Macromolecules, 2011, vol. 44, pp. 4616-4622.
Rimdusit, "Development of New Class of Electronic Packaging Materials Based on Ternary Systems of Benzoxazine, Epoxy, and Phenolic Resins", Polymer, 2000, vol. 41, pp. 7941-7949.
Sudo, "Highly Efficient Catalysts-Acetylacetonato Complexes of Transition Metals in the 4th Period for Ring-Opening Polymerization of 1,3-Benzoxazine", Journal of Polymer Science: Part A: Polymer Chemistry, 2010, vol. 48, pp. 479-484.
Wang, "Cationic Ring-Opening Polymerization of Benzoxazines", Polymer, 1999, vol. 40, pp. 4563-4570.
International Search Report for PCT International Application No. PCT/US2016/032425, dated Sep. 5, 2016, 6 pages.

\* cited by examiner

AMMONIUM SALT CATALYZED BENZOXAZINE POLYMERIZATION

CROSS REFERENCE TO RELATED APPLICATIONS

This application is a national stage filing under 35 U.S.C. 371 of PCT/US2016/032425, filed May 13, 2016, which claims the benefit of U.S. Application No. 62/172,957, filed Jun. 9, 2015, the disclosure of which is incorporated by reference in its/their entirety herein.

FIELD OF THE INVENTION

A process of preparing polybenzoxazines using an ammonium catalyst is described.

BACKGROUND

Benzoxazines and compositions containing benzoxazine are known (see, for example, U.S. Pat. Nos. 5,543,516 and 6,207,786 to Ishida et al.; S. Rimdusit and H. Ishida, "Development of New Class of Electronic Packaging Materials Based on Ternary Systems of Benzoxazine, Epoxy, and Phenolic Resins", Polymer, 41, 7941-49 (2000); and H. Kimura et al., "New Thermosetting Resin from Bisphenol A-based Benzoxazine and Bisoxazoline", J. App. Polym. Sci., 72, 1551-58 (1999).

U.S. Pat. No. 7,517,925 (Dershem et al.) describes benzoxazine compounds and thermosetting resin compositions prepared therefrom. The compositions are said to be useful for increasing adhesion at interfaces within microelectronic packages and low shrinkage on cure and low coefficient of thermal expansion (CTE).

U.S. Pat. No. 7,053,138 (Magendie et al.) describes compositions comprising benzoxazines and thermoplastic or thermoset resins in the manufacture of prepregs and laminates. The compositions are said to yield flame-proofed laminating resins that have high glass transition temperatures.

U.S. Pat. No. 6,376,080 (Gallo) describes a method of preparing a polybenzoxazine which includes heating a molding composition including a benzoxazine and a heterocyclic dicarboxylic acid to a temperature sufficient to cure the molding composition, thereby forming the polybenzoxazine. The compositions are said to have near-zero volume change after post cure.

U.S. Pat. No. 6,207,786 (Ishida et al.) states that the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. FTIR (Fourier transform infrared) analysis is often used to monitor the conversion of the oxazine rings to polymers to provide an estimate of the rate of polymerization at different temperatures. NMR (nuclear magnetic resonance) spectroscopy can also be used to monitor conversion of benzoxazine monomers to polymer.

Epoxy adhesives have been widely used in structural adhesive applications and satisfy many demanding industrial applications. However epoxies have many noted deficiencies that limit their use including limited high temperature stability, high moisture uptake, shrinkage, and a large exotherm on polymerization.

Polybenzoxazines have been proposed to overcome many of the limitations on epoxies. They have lower exotherms on curing, less shrinkage, have higher thermal stability, low byproducts and may be readily prepared from benzoxazines, which in turn, are readily prepared from an amine, formaldehyde and a phenol in high yields. However, current methods of preparing polybenzoxazines require relatively high temperatures, and typically produce brittle, highly crosslinked polymers.

Efforts to reduce the polymerization temperature have included the addition of various phenols or Lewis acid accelerators, or copolymerization of the benzoxazine with epoxides or other monomers such as phenol-formaldehyde. However the resultant polybenzoxazines-epoxy hybrids retain many of the limitations of the epoxies, and compromise many desirable features thereof, such as epoxy toughness.

The present disclosure is directed to a curable composition comprising a benzoxazine compound and an ammonium catalyst. The curable composition may be cured to produce cured compositions useful in coating, sealants, adhesive and many other applications. The present disclosure further provides a curable composition comprising a benzoxazine compound and an ammonium catalyst, which when cured, is useful in high temperature structural adhesive applications. The present disclosure further provides a method of preparing a polybenzoxazine comprising heating the curable composition at a temperature, and for a time sufficient, to effect polymerization.

In one embodiment, the present disclosure provides a polymerizable composition including: a benzoxazine; an ammonium catalyst; and a film-forming material, an optional co-catalyst, a curative, or a combination thereof. In certain embodiments, a polymerizable composition can further include a toughener (i.e., toughening agent), an epoxy resin, a reactive diluent, or combinations thereof.

The present disclosure overcomes many of the deficiencies noted for the polymerization of polybenzoxazines including lower polymerization temperatures and reduced exotherms. In some embodiments, the product polybenzoxazines are flexible solids having good thermal stability, and are useful for many industrial applications.

As used herein, the term "benzoxazine" is inclusive of compounds and polymers having the characteristic benzoxazine ring. In the illustrated benzoxazine group, R is the residue of a mono- or poly-aromatic amine.

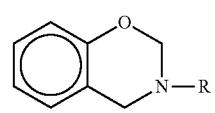

I

As used herein "polybenzoxazine" refers to a compound having two or more benzoxazine rings.

As used herein "poly(benzoxazine)" refers to the polymer resulting from ring-opening polymerization of benzoxazine or polybenzoxazine compounds.

As used herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

As used herein, the term "heteroalkyl" includes both straight-chained, branched, and cyclic alkyl groups with one or more heteroatoms independently selected from S, O, and N both unsubstituted and substituted alkyl groups. Unless otherwise indicated, the heteroalkyl groups typically contain from 1 to 20 carbon atoms. "Heteroalkyl" is a subset of "hetero(hetero)hydrocarbyl" described below. Examples of "heteroalkyl" as used herein include, but are not limited to, methoxy, ethoxy, propoxy, 3,6-dioxaheptyl, 3-(trimethylsilyl)-propyl, 4-dimethylaminobutanyl, and the like. Unless otherwise noted, heteroalkyl groups may be mono- or polyvalent.

As used herein, "aryl" is an aromatic group containing 6-18 ring atoms and can contain fused rings, which may be saturated, unsaturated, or aromatic. Examples of an aryl group include phenyl, naphthyl, biphenyl, phenanthryl, and anthracyl. Heteroaryl is aryl containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent.

As used herein, "(hetero)hydrocarbyl" is inclusive of (hetero)hydrocarbyl alkyl and aryl groups, and hetero(hetero)hydrocarbyl heteroalkyl and heteroaryl groups, the later comprising one or more catenary oxygen heteroatoms such as ether or amino groups. Hetero(hetero)hydrocarbyl may optionally contain one or more catenary (in-chain) functional groups including ester, amide, urea, urethane and carbonate functional groups. Unless otherwise indicated, the non-polymeric (hetero)hydrocarbyl groups typically contain from 1 to 60 carbon atoms. Some examples of such (hetero) hydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl" and "heteroaryl" supra.

As used herein, the term "residue" is used to define the (hetero)hydrocarbyl portion of a group remaining after removal (or reaction) of the attached functional groups, or the attached groups in a depicted formula. For example, the "residue" of butyraldehyde, $C_4H_9$—CHO is the monovalent alkyl $C_4H_9$—. The residue of phenylene diamine $H_2N$—$C_6H_4$—$NH_2$, is the divalent aryl —$C_6H_4$—.

DETAILED DESCRIPTION

The present disclosure provides a method of preparing poly(benzoxazine) polymers by combining a benzoxazine compound and a catalyst comprising an alkylammonium salt of an acid having a pKa (in acetonitrile) of ≥9. This technology allows for a combination of nucleophilic and acid catalyzed cure of benzoxazines at variable temperatures over the range 130-220° C.

In the preparation of the polybenzoxazine, any benzoxazine compound derived from an aromatic amine may be used. Benzoxazines may be prepared by combining a phenolic compound, and aliphatic aldehyde, and a primary aromatic amine compound, such as aniline. U.S. Pat. No. 5,543,516 (Ishida) and U.S. Pat. No. 7,041,772 (Aizawa et al.) hereby incorporated by reference, describe methods of forming benzoxazines. Other suitable reaction schemes to produce mono-, di- and higher-functional benzoxazines are described in N. N. Ghosh et al., *Polybenzoxazine-new high performance thermosetting resins: synthesis and properties*, Prog. Polym. Sci. 32 (2007), pp. 1344-1391.

One suitable method of producing the starting benzoxazine compounds is illustrated by the following reaction scheme:

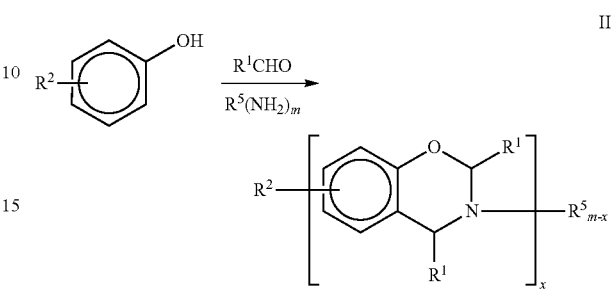

wherein
each $R^1$ is H or an alkyl group, and is the residue of an aliphatic aldehyde,
$R^2$ is H, a covalent bond, a phenol or a polyvalent (hetero)hydrocarbyl group, preferably H, a covalent bond or a divalent alkyl group;
$R^5$ is aryl residue of a primary amino compound, $R^5(NH_2)_m$, where $R^5$ is an aryl group, m is 1-4; and x is at least 1. It will be appreciated that as the $R^2$ group may be part of a polyphenolic compound, said $R^2$ group may bond to another benzoxazine ring as illustrated in Formula IV below. Similarly, as the $R^5$ may be derived from a polyamine, the $R^5$ may also be bonded to another benzoxazine ring as illustrated in Formula III below.

In the preparation of the starting benzoxazine, mono- or polyphenolic compounds may be used. The phenolic compound may be further substituted without limitation is desired. For example, the 3, 4, and 5 positions of the phenolic compound may be hydrogen or substituted with other suitable substituents such as alkyl, cycloalkyl, heterocycloalkyl, aryl, heteroaryl, aralkyl, heteroaralkyl, alkoxy, alkoxyalkylene, hydroxylalkyl, hydroxyl, haloalkyl, carboxyl, halo, amino, aminoalkyl, alkylcarbonyloxy, alkyloxycarbonyl, alkylcarbonyl, alkylcarbonylamino, aminocarbonyl, alkylsulfonylamino, aminosulfonyl, sulfonic acid, or alkylsulfonyl. Desirably at least one of the positions ortho to the hydroxyl group is unsubstituted to facilitate benzoxazine ring formation.

The aryl ring of the phenolic compound may be a phenyl ring as depicted, or may be selected from naphthyl, biphenyl, phenanthryl, and anthracyl. The aryl ring of the phenolic compound may further comprise a heteroaryl ring containing 1-3 heteroatoms such as nitrogen, oxygen, or sulfur and can contain fused rings. Some examples of heteroaryl are pyridyl, furanyl, pyrrolyl, thienyl, thiazolyl, oxazolyl, imidazolyl, indolyl, benzofuranyl, and benzthiazolyl.

Examples or mono-functional phenols include phenol; cresol; 2-bromo-4-methylphenol; 2-allyphenol; 4-aminophenol; and the like. Examples of difunctional phenols (polyphenolic compounds) include phenolphthalein; biphenol; 4-4'-methylene-di-phenol; 4-4'-dihydroxybenzophenone; bisphenol-A; 1,8-dihydroxyanthraquinone; 1,6-dihydroxynaphthalene; 2,2'-dihydroxyazobenzene; resorcinol; fluorene bisphenol; and the like. Examples of trifunctional phenols comprise 1,3,5-trihydroxy benzene and the like.

The aldehyde reactants used in preparing the benzoxazine starting materials include formaldehyde; paraformaldehyde;

polyoxymethylene; as well as aldehydes having the general formula $R^1CHO$, where $R^1$ is H or an alkyl group, including mixtures of such aldehydes, desirably having from 1 to 12 carbon atoms. The $R^1$ group may be linear or branched, cyclic or acyclic, saturated or unsaturated, or combinations thereof. Other useful aldehydes include crotonaldehyde; acetaldehyde; propionaldehyde; butyraldehyde; and heptaldehyde.

Amino compounds useful in preparing the starting benzoxazine can be substituted or unsubstituted aromatic amines having at least one primary amine group. The amines may be aliphatic or aromatic amines. It can be substituted, for example, with groups such as alkyl, cycloalkyl, heterocycloalkyl, aryl, heteroaryl, aralkyl, or heteroaralkyl.

Amines useful in the preparation of the starting benzoxazine compounds include those of the formula $R^5(NH_2)_m$ include aryl monoamines and polyamines. $R^5$ is an aryl group that has a valence of m, and is the residue of a mono-, di- or higher aromatic amine having at least one primary amine group. Subscript m is 1 to 4.

Examples of useful aromatic amines include aniline, o-, m- or p-toluidine, 2,6-dimethyl aniline, 2,5-dimethyl aniline p-bromoaniline, 3,5-dimethyl aniline and 2,4-dimethyl aniline, p-nitroaniline, di-(4-aminophenyl)sulfone, di-(4-aminophenyl)ether, 2,2-bis(4-aminophenyl)propane, 4,4'-diamino diphenylmethane, 3,3'-dimethyl(4,4'-diaminodiphenyl methane, m- or p-phenylene diamine, m-xylylene diamine, toluene diamine, 4,4'methylene dianiline benzidine, 4,4'-thiodianiline, 4-methoxy-1,3-phenyldiamine, 2,6-diaminopyridine, and dianisidine.

It will be understood that monoamines will cyclize with the aldehyde and phenolic compound to produce mono-benzoxazine compounds, while di- or higher amines will cyclize to produce di- and poly-benzoxazine compounds. For example, a diamine (m=2 in the Scheme III below) will produce a di-benzoxazine.

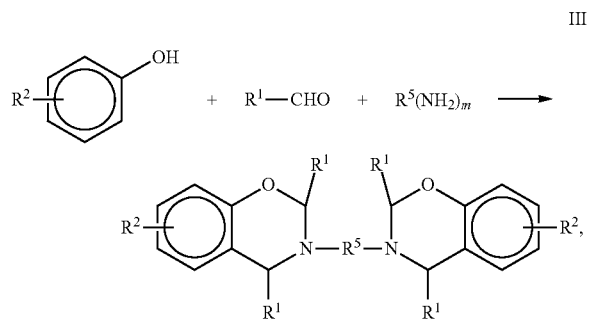

III wherein each $R^1$ is H or an alkyl group, and is the residue of an aliphatic aldehyde;
$R^2$ is H, a covalent bond, or a polyvalent (hetero)hydrocarbyl group, preferably H, a covalent bond or a divalent alkyl group;
$R^5$ is the aryl residue of a primary amino compound.

Further, polymeric benzoxazines may be prepared from a polyphenolic compounds, such as bisphenol-A, and a di-or polyamine, which may be further ring-opening polymerized as shown in Formula IV:

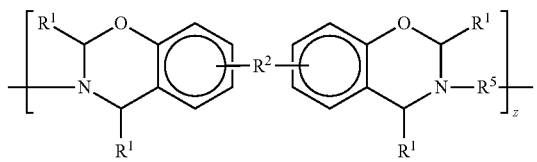

IV wherein
each $R^1$ is H or an alkyl group, and is the residue of an aliphatic aldehyde,
$R^2$ is H, a covalent bond, or a polyvalent (hetero)hydrocarbyl group, preferably H, a covalent bond or a divalent alkyl group;
$R^5$ is the aryl residue of a primary amino compound;
z is at least 1, preferably 2 or greater.

The catalyst for the polymerizable composition comprises an ammonium salt of a primary, secondary or tertiary amine and an acid having a pKa of ≥9 in acetonitrile. More particularly the ammonium catalyst is of the formula:

$$R^{11}R^{12}N^+HR^{13}X^-,$$

where each of $R^{11}$ and $R^{12}$ are independently an alkyl, aryl, alkaryl or aralkyl group, and $R^{13}$ is H, an alkyl, aryl, alkaryl or aralkyl group, and X— is the conjugate base of an acid having a pKa (in acetonitrile) of ≥9. It has been found that such catalysts, selected by basis of the amine and the pKa (acetonitrile) of the acid provide lower polymerization temperatures and reduced exotherms. It has been found that these reduction correlate with the pKa values of the acids in acetonitrile when there is no correlation with the aqueous pKa values. Contrary to expectation, ammonium salts of weaker acids were more effective as polymerization catalysts.

Ammonium catalysts derived from secondary amines are preferred to tertiary amines, which are preferred to primary amines. It is further preferred that when $R^{11}$, $R^{12}$ and/or $R^{13}$ are selected from alkyl they are selected as $C_1$-$C_{30}$ alkyl.

Useful ammonium catalysts include primary, secondary and tertiary amine salts of inorganic acids such as nitric (pKa in acetonitrile of 10.32), HCl (8.9), carboxylic acid such as acetic acid (23.51), trifluoro acetic acid (12.65), benzoic acid (21.51), salicylic acid (16.7), succinic acid (17.6), oxalic acid (14.5) and phenols such as phenol (29.14), 4-nitrophenol (18.14), picric acid (11.00).

Reference may be made to the following for lists of useful acids as selected by acetonitrile values, and means for determining the acetonitrile pKa values: F. Eckert, F., et al., (2009), Prediction of acidity in acetonitrile solution with COSMO-RS. J. Comput. Chem. 2009 30: pp. 799-810. doi: 10.1002/jcc.21103, and Agnes Kütt, et al., A Comprehensive Self-Consistent Spectrophotometric Acidity Scale of Neutral Brønsted Acids in Acetonitrile; J. Org. Chem., 2006, 71 (7), pp 2829-2838. DOI: 10.1021/jo060031y In some embodiments the curable benzoxazine composition may comprise a co-catalyst. Suitable co-catalysts include those selected from the group of elemental sulfur, elemental selenium, a sulfide of a Group VA element (e.g., N, P, As, Sb, Bi) of the Periodic Table (referring to the older CAS or American group numbering system), a sulfide of a Group VIA element (e.g., O, S, Se, Te, Po), a selenide of a Group VA element, a selenide of a Group VIA element, and a combination thereof.

Desirably, the melting point of the selected added co-catalyst is lower than the thermal self-catalysis temperature of the benzoxazine employed.

Crystalline or amorphous forms of elemental sulfur may be used as a co-catalyst. Elemental sulfur is nominally described as a $S_8$ ring, although other polymers and oligomers are known. Various allotropic forms of elemental selenium may be used. Nominally, selenium sulfide refers to many different compounds of sulfur and selenium, but is generally given by the formula $SeS_2$. Phosphorus sesquisulfide, phosphorus pentasulfide, and tetrasulfur tetranitride can be used.

Other suitable co-catalysts are salts of an organometallic complex cation. Such compounds include cations that have at least one carbon atom bonded to a transition metal atom.

In certain embodiments of polymerizable compositions of the disclosure, the organometallic complex salt of the polymerizable compositions of the present disclosure is represented by the following formula:

$$[(L^1)_y(L^2)_z M]^{+q} X \qquad (XX)$$

wherein in Formula (XX):
M is selected from the group Cr, Ni, Mo, W, Mn, Tc, Re, Fe, Ru, Os, Co, Rh, and Ir;
$L^1$ and $L^2$ represent the same or different ligands contributing pi-electrons that can be selected from aromatic compounds and heterocyclic aromatic compounds, and the ligand is capable of contributing six pi-electrons to the valence shell of M;
q is an integer having a value of 1 or 2, the residual charge of the complex cation;
y and z are integers having a value of 0, 1, or 2, provided that the sum of y and z is equal to 2;
X is a suitable anion (one that does not interfere with the polymerization); and
n is an integer having a value of 1 or 2, the number of complex anions required to neutralize the charge q on the complex cation.

Exemplary such organometallic salts suitable for use as co-catalysts are described in International Publication No. WO 2002/000757 (Mahoney et al.), as well as U.S. Pat. No. 5,089,536 (Palazzotto), U.S. Pat. No. 5,059,701 (Keipert), and U.S. Pat. No. 5,191,101 (Palazzotto et al.), as well as EP Pub. Nos. 094,914 (Irving et al.), 094,915 (Meier et al.), and 126,712 (Meier et al.), Various combinations of co-catalysts can be used if desired.

If a co-catalyst is used, it is present in an amount of at least 0.1 wt-%, based on the total weight of the polymerizable composition. If a co-catalyst is used, it is present in an amount of no greater than 10 wt-%, 5 wt-%, or 2 wt-%, based on the total weight of the polymerizable composition.

Polymerizable compositions of the disclosure optionally include one or more curatives. Such curatives are selected from the group of a thiol compound, an amine compound, and a combination thereof. In certain embodiments, at least one of the thiol compound and the amine compound is polyfunctional. Such curatives can function as reactive diluents.

Useful such compounds have at least one nucleophilic functional group that ring-opens the benzoxazine. Such compounds are of the generally formula:

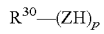  (XII)

wherein, in Formula (XII):
$R^{30}$ is a (hetero)hydrocarbyl group;
each Z is independently —S— or —$NR^{31}$, where $R^{31}$ is H or a hydrocarbyl group, including aryl and alkyl; and
p is 1 to 6 (in certain embodiments, p is at least 2).

As mentioned above, the polymerization of benzoxazine monomers to a polymer is believed to be an ionic ring opening polymerization which converts the oxazine ring to another structure, e.g., linear polymer or larger heterocyclic rings. It is thought that a chain transfer step(s) limits the molecular weight of the resulting polymer and causes some branching. The ring-opening reaction may be represented by the following Scheme I for reaction of a benzoxazine based on bisphenol A with a curative of formula $R^{10}$—$(ZH)_2$ to form a polymeric material:

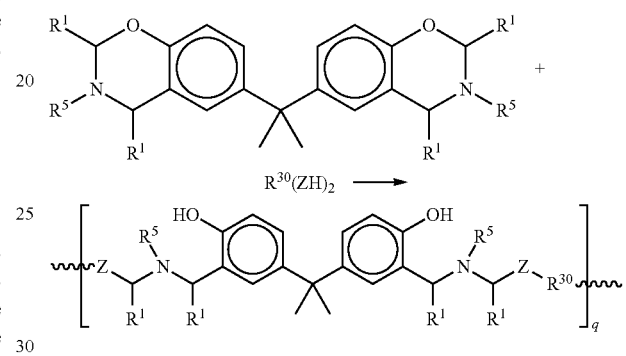

In Scheme I:
each $R^1$ is independently H or an alkyl group, and is the residue of an aliphatic aldehyde,
Each $R^5$ is independently a (hetero)hydrocarbyl residue of a primary amino compound;
each $R^{30}$ is independently a (hetero)hydrocarbyl group;
Z is a —S— or —$NR^{11}$, wherein each $R^{11}$ is H or a hydrocarbyl group, including aryl and
alkyl p is 1 to 6, or 2 to 6; and
q is the number of repeat units and is at least 1 (in certain embodiments, q is at least 2).

Although the curative illustrated in Scheme 1 only has two —ZH groups, other curatives can have more than two —ZH groups. Thus, after reacting with two benzoxazine groups, such curatives can have additional —ZH groups available for further reactions with additional benzoxazine groups. Further, in embodiments where the starting benzoxazine was prepared with a polyamine, $R^5$ groups may be connected to additional benzoxazine groups. Note further that as the composition comprises at least one polyfunctional thiol compound or amine compound, polymeric reaction products result.

In these embodiments there is an excess of benzoxazine, as an unreacted benzoxazine will homopolymerize in the presence of the catalyst to form a coextensive mixture or polymer network of benzoxazine adducts with the curative of Formula (XII) and poly(benzoxazines). In such embodiments, the molar amounts ratio of benzoxazine groups to the sum of amine and/or thiol "Z" groups from the compound $R^{10}$—$(ZH)_p$, is 3:1 to 100:1, or in certain embodiments 4:1 to 50:1.

With reference to the curative of Formula (XII), $R^{30}$—$(ZH)_p$, the benzoxazine ring may be ring-opened by an amine compound. Useful amine compounds correspond to primary and secondary amines of the formula:

  (XIII)

wherein, in Formula (XIII), $R^{30}$, $R^{11}$, and p are as defined above for Formula (XII). Such compounds include primary and secondary (hetero)hydrocarbyl monoamines and polyamines. In the compounds of Formula (VIII), the $R^{10}$ may be (hetero)hydrocarbyl group that has a valence of p, and is the residue of a mono-, di- or higher amine having at least one primary amine group. The $R^{30}$ can be an alkyl, a cycloalkyl or aryl, and p is 1 to 4, or 2 to 4. In certain embodiments, the $R^{30}$ is selected from mono- and polyvalent (hetero)hydrocarbyl (i.e., alkyl and aryl compounds having 1 to 30 carbon atoms, or alternatively (hetero)hydrocarbyl including heteroalkyl and heteroaryl having 1 to twenty heteroatoms of oxygen). Each $R^{11}$ is independently H or a hydrocarbyl group, including aryl and alkyl, and p is 1 to 6, or 2 to 6. It will be clear to one skilled in the art that the same amines used in the preparation of the benzoxazines will also be useful in the ring-opening reaction.

The benzoxazine ring may also be opened with thiols of the formula:

$$R^{30}-(SH)_p \quad (XIV)$$

wherein, in Formula (XIV), $R^{30}$ and p are as defined above for Formula (XII). That is, in the compounds of Formula (XIV), p is 1 to 6, or 2 to 6, and $R^{30}$ includes a (hetero) hydrocarbyl group, including aliphatic and aromatic mono- thiols and polythiols. $R^{30}$ may optionally further include one or more functional groups including hydroxyl, acid, ester, cyano, urea, urethane and ether groups.

In some preferred embodiments, the thiol compounds of Formula (XIV) are of the formula:

$$R^{32}-[(CO_2)_x-R^{33}-SH]_y \quad (XV)$$

wherein in Formula (XV):
$R^{32}$ is an alkylene group, an aryl group, an oxyalkylene group, or combination thereof; $R^{33}$ is a divalent hydrocarbyl group;
x is 0 or 1; and
y is 1 to 6, preferably 2 to 6.

In certain embodiments, the compounds of Formulas (XV) to are those in which $R^{32}$ is an alkylene group.

Useful alkyl thiols include methyl, ethyl and butyl thiol. Other useful thiols include 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, mercaptoalkanoic acids and esters thereof including mercaptoproionic acid, 2-chloroethanethiol, 2-amino-3-mercaptopropionic acid, dodecyl mercaptan, thiophenol, 2-mercaptoethyl ether, and pentaerythritol tetrathioglycolate. Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminally thiol-substituted carboxylic acid (or derivative thereof such as esters or acyl halides) including α- or β-mercaptocarboxylic acids such as thioglycolic acid or β-mercaptopropionic acid or esters therof. Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate) pentaerythritol tetrakis(3-mercaptopropionate), all of which are commercially available. A specific example of a polymeric polythiol is polypropylene ether glycol bis(3-mercaptopropionate) which is prepared from polypropylene-ether glycol (e.g., that available under the trade name PLURAXOL P201 from BASF Wyandotte Chemical Corp.) and 3-mercaptopropionic acid by esterification.

In some embodiments, useful thiols include those thiols derived from epoxy compounds. The polythiol may be derived from the reaction between $H_2S$ (or equivalent) and an epoxy resin having two or more functional groups and preferably having a molecular weight of less than 1000. For example, bifunctional epoxy resins, such as a bisphenol A epoxy resin and a bisphenol F epoxy resin, and novolak epoxy resins, such as a phenolic novolak epoxy resin and a cresol novolak epoxy resin, or amine epoxy resins, can be used. In addition, generally known polyfunctional epoxy resins, heterocycle-containing epoxy resins, and alicyclic epoxy resins can be used. These epoxy resins may be used alone or in combinations of two or more chemical types or molecular weight ranges.

A particularly useful polythiol is that derived from bisphenol-A diglycidyl ether, available as QX-11 from Japan Epoxy Resins, having a thiol equivalent weight of approximately 245 and the following general structure, where n is at least 1:

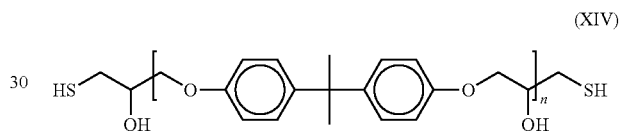

(XIV)

Useful soluble, high molecular weight thiols include polyethylene glycol di(2-mercaptoacetate), and those resins available under the trade names LP-3 (supplied by LP North America, Houston, Tex.) and PERMAPOL P3 (supplied by Products Research & Chemical Corp., Glendale, Calif.), and compounds such as the adduct of 2-mercaptoethylamine and caprolactam.

The compounds of Scheme I may be prepared by combining the benzoxazine compounds with a curative either neat or in a suitable solvent. Suitable solvents include those in which the reactants dissolve, preferably at room temperature, and that are nonreactive with the various components in the polymerizable composition. Examples of suitable solvents include butyl acetate, toluene, xylene, tetrahydrofuran, ethylene glycol dimethyl ether and the like. Heating is generally unnecessary as the thiol and amine-induced ring opening is exothermic.

Combinations of various curatives can be used if desired.

If used, a curative is present in an amount of at least 5%, and often as much as 60% of the benzoxazine equivalent.

Polymerizable compositions of the present disclosure may include a film-forming material, which can be in the form of monomers, oligomers, polymerizable pre-polymers, polymers, or a combination thereof. These materials, as the name suggests, enable the formation of benzoxazine-containing films that reduce the brittleness of typical benzoxazines. Such films are typically flexible and tacky over a desired temperature window in the sub-ambient to benzoxazine-cure temperature range. The film-former may be reactive or nonreactive with the benzoxazine, or any other components such as the catalyst, co-catalyst, curative, toughener, and the like.

In some embodiments the film-formers are materials, particularly oligomers or polymers, which form a homogenous mixture with the benzoxazine/catalyst mixtures at processing temperatures, preferably from sub-ambient to the processing of the polymerizable benzoxazine composition. Catalyst present in these films provides for excellent shelf life even when the films are stored at elevated temperatures.

Optionally, film formers can have reactive functional groups that react with a portion of the benzoxazine. The film-forming material may include a reactive film-forming material that includes one or more functional groups reactive with the benzoxazine, such as those selected from the group of a thiol, an amine, a benzoxazine, a formaldehyde, an aldehyde, and a combination thereof. The reactive film-forming material may include a compound that can react with, and be bonded to, the benzoxazine. The presence of one or more functional groups can afford increased processability options for said films: they can be processed above or below the reaction temperature of the reactive group to afford variable degree of tack, flexibility, and other desirable properties. Examples of such reactive film formers include, but are not limited to, amine-terminated butadiene-nitrile (ATBN), hydroxy-terminated butadiene-nitrile (HOTBN), carboxy-terminated butadiene-nitrile CTBN, amine-terminated poly(alkylene oxides) (such as those available under the trade names JEFFAMINE and VERSALINK) and related compounds.

In some embodiment the reactive film-formers may have different reactive groups in the backbone and termini. Examples of such materials include the end-functional butadiene-nitrile rubbers such as ATBN, which has unsaturation in its repeat unit and amine functional reactive groups on its ends. The amine functional groups may react with the benzoxazine by nucleophilic ring-opening (e.g., as described herein with respect to the curatives), and the unsaturation may react with the catalyst by vulcanization.

Examples of suitable nonreactive film-forming polymers for coating formulations include acrylic polymers (e.g., poly(methyl methacrylate-co-ethyl acrylate) and poly(methyl acrylate-co-acrylic acid)); polyurethanes (e.g., reaction products of aliphatic, cycloaliphatic or aromatic diisocyanates with polyester glycols or polyether glycols); polyolefins; polystyrene; copolymers of styrene with acrylate(s) (e.g., poly(styrene-co-butyl acrylate); polyesters, (e.g., polyethylene terephthalate, polyethylene terephthalate isophthalate, and polycaprolactone); polyamides, (e.g., polyhexamethylene adipamide); vinyl polymers, (e.g., poly(vinyl acetate/methyl acrylate) and poly(vinylidene chloride/vinyl acetate); polydienes, (e.g., poly(butadiene/styrene)); cellulosic polymer including cellulose ethers and cellulose esters, (e.g., ethyl cellulose and cellulose acetate/butyrate); polyimides; polysulfones; urethane-acrylate copolymers; and polyethers. Such polymers are available, for example, from commercial sources or may be prepared using methods and starting materials known in the art.

Combinations of various film-forming materials may be used if desired.

If used, film-forming material is present in an amount of at least 10 wt-%, and in certain embodiments, at least 25 wt-%, based on the total weight of the polymerizable composition. If used, film-forming material is present in an amount of no greater than 75 wt-%, and in certain embodiments, no greater than 50 wt-%, based on the total weight of the polymerizable composition.

Certain other optional additives may also be included, including, for example, tougheners, epoxy resin, and other reactive diluents. Such additives provide various functions (e.g., film formation). For example, a toughening agent may reduce brittleness and/or add strength to the composition after curing without interfering with curing. An epoxy resin may reduce the viscosity, lower Tg, and/or function as a carrier for a toughening agent.

It will be understood by one of skill in the art that one compound may form two or more different functions. For example, a compound may function as both a toughening agent and a curative.

In some embodiments, such additives will not react with the benzoxazine. In some embodiments, such additives may include reactive functional groups, particularly as end groups.

Examples of such reactive functional groups include, but are not limited to, amines, thiols, alcohols, epoxides, vinyls, and combinations thereof. Toughening agents are useful in polymerizable compositions of the present disclosure are polymeric compounds having both a rubbery phase and a thermoplastic phase such as: graft polymers having a polymerized, diene, rubbery core and a polyacrylate, polymethacrylate shell; graft polymers having a rubbery, polyacrylate core with a polyacrylate or polymethacrylate shell; and elastomeric particles polymerized in situ in the epoxide from free radical polymerizable monomers and a copolymerizable polymeric stabilizer.

Examples of useful toughening agents of the first type include graft copolymers having a polymerized, diene, rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski). Exemplary rubbery backbones include polymerized butadiene or a polymerized mixture of butadiene and styrene. Exemplary shells including polymerized methacrylic acid esters are lower alkyl ($C_1$-$C_4$) substituted methacrylates. Exemplary monovinyl aromatic hydrocarbons are styrene, alpha-methylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would poison the catalyst.

Examples of useful toughening agents of the second type are acrylate core-shell graft copolymers wherein the core or backbone is a polyacrylate polymer having a glass transition temperature below 0° C., such as polybutyl acrylate or polyisooctyl acrylate to which is grafted a polymethacrylate polymer (shell) having a glass transition above 25° C., such as polymethylmethacrylate.

The third class of toughening agents useful in the invention includes elastomeric particles that have a glass transition temperature ($T_g$) below 25° C. before mixing with the other components of the composition. These elastomeric particles are polymerized from free radical polymerizable monomers and a copolymerizable polymeric stabilizer that is soluble in the benzoxazine. The free radical polymerizable monomers are ethylenically unsaturated monomers or diisocyanates combined with co-reactive difunctional hydrogen compounds such as diols, diamines, and alkanolamines.

Useful toughening agents include core/shell polymers, such as methacrylate-butadiene-styrene (MBS) copolymer wherein the core is crosslinked styrene/butadiene rubber and the shell is polymethylacrylate (for example, those available under the trade names ACRYLOID KM653 and KM680, from Rohm and Haas, Philadelphia, Pa.), those having a core including polybutadiene and a shell including poly(methyl methacrylate) (for example, those available under the trade names KANE ACE M511, M521, B11A, B22, B31, and M901 from Kaneka Corporation, Houston, Tex. and CLEARSTRENGTH C223 from ATOFINA, Philadelphia, Pa.), those having a polysiloxane core and a polyacrylate shell (for example, those available under the trade names CLEARSTRENGTH S-2001 from ATOFINA and GENIOPERL P22 from Wacker-Chemie GmbH, Wacker Silicones, Munich, Germany), those having a polyacrylate core and a poly(methyl methacrylate) shell (for example, those available under the trade names PARALOID EXL2330 from Rohm and Haas and STAPHYLOID AC3355 and AC3395 from Takeda Chemical Company, Osaka, Japan), those having an MBS core and a poly(methyl methacrylate) shell (for example, those available under the trade names PARALOID EXL2691A, EXL2691, and EXL2655 from Rohm and Haas); and the like; and mixtures thereof.

As used above, for acrylic core/shell materials "core" will be understood to be an acrylic polymer having a $T_g$ of less than 0° C. and "shell" will be understood to be an acrylic polymer having a $T_g$ of greater than 25° C.

Other useful toughening agents include: carboxylated and amine terminated acrylonitrile/butadiene vulcanizable elastomer precursors, such as those available under the trade names HYCAR CTBN 1300X8, ATBN 1300X16, and HYCAR 1072 from B. F. Goodrich Chemical Co.; butadiene polymers, such as those available under the trade name HYCAR CTB; amine functional polyethers such as HCl 101 (i.e., polytetramethylene oxide diamine) a 10,000 MW, primary amine-terminated, compound from 3M Co., St. Paul, Minn., and those available under the trade name JEFFAMINE from Huntsman Chemical Co., Houston, Tex.; functional acrylic rubbers including acrylic core/shell materials, such as those available under the trade names ACRYLOID KM330 and 334 from Rohm & Haas; and core/shell polymers, such as methacrylate-butadiene-styrene (MBS) copolymer wherein the core is crosslinked styrene/butadiene rubber and the shell is polymethylacrylate (e.g., that available under the trade names ACRYLOID KM653 and KM680; Rohm and Haas). Useful liquid poly-butadiene hydroxyl terminated resins include those available under the trade names LIQUIFLEX H by Petroflex of Wilmington, Del., and HT 45 by Sartomer of Exton, PN.

Tougheners may include epoxy-terminated compounds, which can be incorporated into the polymer backbone. A typical, preferred, list of tougheners includes: acrylic core/shell polymers; styrene-butadiene/methacrylate core/shell polymers; polyether polymers; carboxylated acrylonitrile/butadienes; and carboxylated butadienes. Advantages can be obtained from the provision of the chain extension agent in a composition with an epoxy resin even in the absence of a toughening agent as described above. However, particular advantage is achieved from the presence of the toughening agent or combinations of different agents, as previously suggested.

It will be appreciated that some of the described natural and synthetic rubbers will have unsaturation in the chain that can be crosslinked by the catalyst. Thus, the catalyst will polymerize the benzoxazine, and concurrently vulcanize the rubber to for a coextensive network of poly(benzoxazine) and vulcanized rubber.

Various combinations of toughening agents can be used if desired.

If used, a toughening agent is present in a polymerizable composition in an amount of at least 3 wt-%, or at least 5 wt-%, based on the weight of the benzoxazine. If used, a toughening agent is present in a polymerizable composition in an amount of no greater than 35 wt-%, or no greater than 25 wt-%, based on the weight of the benzoxazine.

Other optional additives include epoxy resins. Such materials may function as a curative, a reactive diluent, or a co-reactant. The epoxy group does not react directly with the benzoxazine as do the amines or thiols of the curatives, but the phenolic group resulting from the ring opening of the benzoxazine may further react to ring-open the epoxy groups.

Polyepoxy compounds which can be utilized in the compositions of the disclosure include both aliphatic and aromatic polyepoxides. In certain embodiments, glycidyl aliphatic epoxides are preferred. The aromatic polyepoxides are compounds containing at least one aromatic ring structure, e.g., a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the disclosure include 3',4'-epoxycyclohexylmethyl-3,4-epoxycyclohexanecarboxylate, 3,4-epoxycyclohexyloxirane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof. Preferred such polyepoxides do not include cycloaliphatic groups.

Representative examples of aromatic polyepoxides, which can be utilized in the composition of the disclosure, include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-(4-(2,3-epoxypropoxy)phenylpropane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,31-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. No. 3,018,262 (Schroeder) and U.S. Pat. No. 3,298,998 (McConnell et al.), as well as the derivatives described in the Handbook of Epoxy Resins by Lee and Neville, McGraw-Hill Book Co., New York (1967), and mixtures thereof.

An exemplary class of polyepoxy compounds is polyglycidyl ethers of polyhydric alcohol, particularly polyphenols. The glycidyl epoxy compounds are generally more reactive toward amines than cycloaliphatic epoxy compounds. In some embodiments, the epoxy compound generally has an epoxy equivalent weight (EW) of 170 to 4,000, or 170 to 1,000. The epoxide equivalent weight (EW) is defined as the weight in grams of the epoxy functional compound that contains one gram equivalent of epoxy (oxirane) functional groups.

If used, an epoxy resin is present in a polymerizable composition in an amount of at least 5 wt-%, or at least 3 wt-%, based on the weight of the benzoxazine. If used, a toughening agent is useful in a polymerizable composition in an amount of no greater than 35-wt-%, or no greater than 25 wt-%, based on the weight of the benzoxazine.

Other optional additives, or adjuvants, may be added to the compositions as desired. Examples of such other optional additives include as colorants, abrasive granules, anti-oxidant stabilizers, thermal degradation stabilizers, light stabilizers, conductive particles, tackifiers, flow agents, bodying agents, flatting agents, inert fillers, binders, blowing agents, fungicides, bactericides, surfactants, plasticizers, rubber tougheners, and other additives known to those skilled in the art. Such additives are typically substantially unreactive, such as fillers, both inorganic and organic. These adjuvants, if present, or other optional additives, are added in an amount effective for their intended purpose.

The choice and amounts of optional components depend on the needs of the specific application. For example, for a structural/semi-structural benzoxazine adhesive, the polymerizable composition could contain silica fillers, glass bubbles, and tougheners. These adjuvants add toughness to and reduce the density of the polymerized composition. For a protective coating, such as an abrasion resistant coating, which is generally hard, requires a significant portion of the formulation to be a hard resin that includes generally short chain lengths and high functionality. Coatings undergoing some flex require toughness which can be obtained by using the above-mentioned additive to increase toughness and increase flexibility. Clear coatings require the cured resins to have little to no phase separation. This is obtained by controlling the compatibility of the resins or controlling phase separation by cure rate.

Reaction conditions for curing the composition depend on the reactants and amounts used and can be determined by those skilled in the art. The curable compositions are made by mixing in any order the benzoxazine compound and the ammonium catalyst described above. Generally, the composition is then heated to a temperature between about 50 and 200° C., preferably between about 130-180° C., for a time of about 1-120 minutes.

Suitable sources of heat to cure the compositions of the invention include induction heating coils, ovens, hot plates, heat guns, infrared sources including lasers, microwave sources. Suitable sources of light and radiation include ultraviolet light sources, visible light sources, and electron beam sources.

Solvents can be used to assist in dissolution of the ammonium catalyst in the benzoxazine monomers, and also as a processing aid. It may be advantageous to prepare a concentrated solution of the ammonium catalyst in a small amount of solvent to simplify the preparation of the polymerizable composition. Useful solvents are lactones, such as gamma-butyrolactone, gamma-valerolactone; and epsilon-caprolactone; ketones such as acetone, methyl ethyl ketone, methyl isobutyl ketone, cyclopentanone and cyclohexanone; sulfones, such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2-(methyl sulfonyl)ethanol, 2,2'-sulfonyldiethanol; sulfoxides, such as dimethyl sulfoxide; cyclic carbonates such as propylene carbonate, ethylene carbonate and vinylene carbonate; carboxylic acid esters such as ethyl acetate, methyl cellosolve acetate, methyl formate; and other solvents such as methylene chloride, nitromethane, acetonitrile, glycol sulfite and 1,2-dimethoxyethane (glyme).

Compositions of this invention are useful for coatings, foams, shaped articles, adhesives (including structural and semistructural adhesives), magnetic media, filled or reinforced composites, coated abrasives, caulking and sealing compounds, casting and molding compounds, potting and encapsulating compounds, impregnating and coating compounds, conductive adhesives for electronics, protective coatings for electronics, and other applications that are known to those skilled in the art. When uncured or partially cured, the benzoxazine compositions exhibit pressure-sensitive adhesive properties, including tack. In some embodiments, the present disclosure provides a coated article comprising a substrate, having a cured coating of the benzoxazine thereon.

To prepare a structural/semi-structural benzoxazine adhesive, the curable composition could contain additional adjuvants such as silica fillers, glass bubbles and tougheners. These adjuvants add toughness to and reduce the density of the cured composition. Useful fillers may include additional optional materials such as reinforcement-grade (reinforcing) filler materials, pigments, antioxidants, stabilizing agents, processing aids, neutralizers, rheology modifiers, silane coupling agents, flow control agents, lubricants, flame retardants, flame retardant synergists, antimicrobials, any other additive known in the art, and any combination of these in any proportion. The concentration of these additional materials in the curable composition of the present invention may be any concentration sufficient to provide a desired result.

Reinforcement-grade (reinforcing) filler material may optionally be included in the curable composition to enhance the physical properties of cured composition at elevated temperatures. Examples of suitable filler materials include silica-based reinforcement filler, reinforcement-grade carbon black, fluoroplastics, clays, and any combination of any of these in any proportions.

Examples of suitable silica-based reinforcement fillers include silica (also referred to as silicon dioxide); silane-treated silica; fumed silica (e.g., such as the CABOSIL™ M-5 product commercially from Cabot Corporation of Billerica, Mass.); silane-treated fumed silica such as, for example, the AEROSIL™ R972 product, the AEROSIL™ R974 product, and the AEROSIL™200 product that are all commercially available from Degussa Company of Parsippany, N.J. and the CABOSIL™ line of silane-treated fumed silica products commercially from Cabot Corporation of Billerica, Mass.; silicates; and any combination of any of these in any proportion.

Examples of suitable silicates include calcium silicate (wollastonite), aluminum silicate, and mixtures of these. In some embodiments, the average particle size of the silica-based reinforcement filler may be less than about 100 nanometers (nm). Glasses may be used, including fiberglass filament and mats. In other embodiments, the average particle size of the silica-based reinforcement filler may be as low as about 10 nm and as high as about 20 nm.

The phrase "reinforcement-grade carbon black" as used herein, includes any carbon black with an average particle size smaller than about 40 nm, which corresponds to an average surface area of about 65 $m^2$/g. Some particularly suitable average particle sizes for reinforcement-grade carbon black range from about 9 nm to about 40 nm. Carbon black that is not reinforcement grade include carbon black with an average particle size larger than about 40 nm. Carbon fibers and carbon nanotubes are also contemplated as useful fillers.

To prepare protective coatings, the choice of materials depends on the needs of the specific application. Abrasion resistant coatings are generally hard and require a significant portion of the formulation to be a hard resin, which are generally short chain length and have high functionality. Coatings undergoing some flex require toughness which can be obtained by lowering the crosslink density of the cure formulation. Clear coatings require the cured resins to have little to no phase separation. This is obtained by controlling the compatibility of the resins or controlling phase separation by cure rate. Adjuvants could be added to these coating formulations in an amount effective for their intended use.

The composition may be coated onto substrates at useful thicknesses ranging from 25-500 micrometers or more. Coating can be accomplished by any conventional means such as roller, dip, knife, or extrusion coating. Solutions of the curable composition may be used to facilitate coating. Stable thicknesses are necessary to maintain the desired coating thickness prior to crosslinking of the composition to form the crosslinked composition.

Useful substrates can be of any nature and composition, and can be inorganic or organic. Representative examples of useful substrates include ceramics, siliceous substrates including glass, metal, natural and man-made stone, woven and nonwoven articles, polymeric materials, including thermoplastic and thermosets, (such as polymethyl (meth)acrylate), polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood and composites of the foregoing materials.

The instant disclosure further provides a pressure-sensitive adhesive which comprises a coating of the uncured or partially cured benzoxazine composition on a suitable substrate, such as an adhesive tape backing. A preferred method of preparing a pressure-sensitive adhesive article comprises partially curing the novel composition to a useful coating viscosity, coating the partially crosslinked composition onto a substrate (such as a tape backing) and further curing the composition. Useful coating viscosities are generally in the range of 500 to 10,000 cps.

The curable benzoxazine compositions may also be useful in the preparation of reinforced composite articles, such as prepregs for use in high performance applications such as manufacture of aircraft components. Fiber reinforced composites provide structural efficiency at lower densities compared to metallic structures, allowing for the manufacture of light weight, high strength components. Fiber reinforced composites may be prepared using a variety of techniques, for example, hand or automated layup of prepreg, filament winding, compression molding and resin transfer molding. Of these techniques, hand or automated layup of prepreg is most common.

The present invention also provides a prepreg comprising a fiber reinforcement impregnated with the curable bezxoxazine composition described above. The prepreg comprises a fiber reinforcement impregnated with an uncured or partially cured curable benzoxazine resin matrix. Prepregs are available in a variety of forms depending on the configuration of the fiber reinforcement. For example, when the fiber reinforcement comprises a fiber bundle (or tow), the prepreg is specifically referred to as a "towpreg". By way of another example, when the fiber reinforcement comprises a collimated series of fiber bundles, the prepreg is specifically referred to as "prepreg tape".

Prepregs are typically supplied to part fabricators who convert the material into cured composite components using heat and pressure to cure the resin. For example, when the prepreg is in the form of a tape, the part fabricator cuts lengths of the tape and places them on a tool surface in the desired ply orientation. This operation can be done manually or automatically and is generally referred to as "layup". When the tool has a complex or curved or vertical configuration, the prepreg preferably has good tack to hold the plies together and to the tool until layup is complete. The prepreg also preferably has good drape or conformability, allowing it to conform to the tool shape. Preferably, the prepreg cures uniformly to provide composite parts having high glass transition temperatures. This allows the cured composite to withstand a variety of stresses (such as elevated temperatures, mechanical stresses, exposure to solvents, etc.) without loss of structural integrity.

The present disclosure also provides a method of making a prepreg comprising the steps of providing the curable benzoxazine composition; providing a fiber reinforcement; and impregnating the fiber reinforcement with the resin matrix. The present invention further provides cured composites prepared from prepregs of the invention. The cured composites can be used as structural and non-structural aircraft components, space structures, pressure vessels, tanks, pipes, composites for electronics such as circuit boards, and automotive body and engine parts, and the like.

The purpose of the fiber reinforcement is to provide strength to the cured composite. The fibers of the fiber reinforcement can comprise a variety of different materials including glass fibers, carbon fibers, polyamide fibers such as poly(p-phenylene terephthalamide) fibers (for example, Kevlar' fiber available from E.I. duPont de Nernours and Co., Inc., Wilmingtom, Del.) and ceramic fibers. Carbon fibers are typically used as the reinforcing fiber in advanced aerospace structural composites.

The fiber reinforcement may comprise a variety of configurations. For example, the fiber reinforcement may comprise a woven structure constructed by interlacing yarns, fibers or filaments to form patterns such as plain, harness satin or leno weaves. Alternatively, the fiber reinforcement may comprise a nonwoven structure or planar textile structure produced by loosely compressing together fibers, yarns, and the like. The fiber reinforcement may also comprise a tow (i.e., an untwisted bundle of continuous fibers) or a roving (i.e., a number of yarns, strands, tows or ends collected into a parallel bundle with little or no twist).

The fibers of the reinforcement may be unsized or coated with sizing. Preferably, the fibers are unsized. When a sizing is used, however, it preferably does not materially affect the performance of the ultimate prepreg or cured composite, for example, by causing a substantial reduction in $T_g$.

The curable benzoxazine composition can be used to impregnate a variety of fiber reinforcements such as tows (i.e., bundles of fibers), or woven structures. Impregnation may be accomplished, for example, by heating the benzoxazine composition to temperatures at which it will flow and depositing it onto the fiber reinforcement. It is also possible to provide, for example, a bath of flowing benzoxazine composition and immerse the fiber reinforcement (such as tow) in the bath. Impregnation of the fiber reinforcement may also be accomplished by forming a film of the benzoxazine composition on a release liner and subsequently transfer laminating the film to a fiber reinforcement using pressure and/or heat. Preferably, for this lamination process, the curable benzoxazine composition has a viscosity in the range of from 10 to 30 poise at temperatures less than 150° C. for ease of processing and to provide sufficient wet out of the fibers of the reinforcement without initiating resin cure. Alternatively, the fiber reinforcement may be placed on a tool and then impregnated with the resin composition by application of heat, pressure, and vacuum, or any combinations thereof. Methods for preparing prepregs employ solvent-free processing for environmental reasons and to preclude the presence of residual volatiles which can cause porosity during cure, possibly resulting in reduced performance The prepreg is then cured using heat and pressure such as provided by autoclave or press curing. Benzoxazine compositions of the invention may be used to provide cured composites using a variety of processes such as pultrusion, filament winding, automated fiber placement, resin transfer molding, continuous resin transfer molding, resin film infusion, automated tow placement, automated and manual tape lay-up, vacuum bag lamination, press lamination, roll lamination, and the like.

Cured composites of the invention advantageously exhibit little to no resin migration and $T_g$s that are comparable to the corresponding neat resins. These characteristics enable the cured composite to withstand a variety of stresses (such as elevated temperatures, mechanical stresses, exposure to solvents, etc.) without loss of structural integrity.

EXAMPLES

All materials were used as received from chemical vendors without further purification.

TABLE 1

MATERIALS - ABBREVIATIONS EMPLOYED

| | |
|---|---|
| BisA-a | ARALDITE MX 35600 benzoxazine available from Huntsman Advance Materials, Texas |
| Ph-a | Phenol/aniline benzoxazine, RD2010-008 from Huntsman Advance Materials, Texas, made from phenol, aniline, and two equivalents of formaldehyde. |
| EAC | Ethylamime hydrochloride, CAS #: 557-66-4; available from Alfa Aesar, Ward Hill, MA |
| DEAC | Diethylamine hydrochloride, CAS #: 660-68-4; available from Alfa Aesar, Ward Hill, MA |
| TEAC | Triethylamine hydrochloride, CAS #: 554-68-7; available from Alfa Aesar, Ward Hill, MA |
| BMA | N-Benzylmethylamine, CAS #: 103-67-3; available from Sigma-Aldrich, Milwaukee, WI |
| BMAC | N-Benzylmethylamine hydrochloride, CAS #: 13426-94-3; Synthesized as described in the experimental section. |
| BMATFA | N-Benzylmethylammonium trifluoroacetate, CAS #: 102234-85-5; Synthesized as described in the experimental section. |
| BMATSA | N-Benzylmethylamine toluenesulfonic acid, CAS #: 34102-54-0; Synthesized as described in the experimental section. |
| MXDA-2HCl | m-Xylylenediamine dihydrochloride; Synthesized as described in the experimental section. |
| DBU-Ph | 1,8-Diazabicyclo[5.4.0]undec-7-ene, compound with phenol (1:1), CAS #: 57671-19-9; available from Sigma-Aldrich, Milwaukee, WI |
| Benzoxazine | Benzoxazine; available from Sigma-Aldrich, Milwaukee, WI |

Test Methods
Differential Scanning Calorimetry (DSC Analysis)

Samples were prepared by melting appropriate amount of benzoxazine and admixing the requisite amount of the amine salt. Mixtures were 10 molar equivalents of monofunctional benzoxazine (Ph-a) to 1 molar equivalent of amine salt except where noted. In the case of difunctional BisA-a benzoxazine the mixtures were 5 molecular equivalents of monomer to 1 equivalent of amine salt, so that the total molar equivalents of benzoxazine functionality to amine salt remained 10:1.

The thermal properties of a composition during curing were determined by placing a 4-8 mg aliquot of the composition in an aluminum pan in a Differential Scanning calorimeter (DSC) and heating from 0° C., 20° C., or 25° C. to 325° C. at a heating rate of 10° C./min. The DSC instrument was from TA Instruments, New Castle, Del., is designated as "TA". The peak cure temperature in ° C. ("Peak"), the approximate cure onset temperature in ° C. ("Onset"), and the total energy released ("Energy") in Joules/gram (J/g) during curing of the composition from the DSC trace were reported.

Additional experiments were performed on selected samples at heating rates of 2.00, 5.00, 8.00, and 15.00° C./min, to investigate the activation energy for polymerization as outlined in Hamerton, I., et al., Macromolecules, 2013(46), 5117-5132.

Nuclear Magnetic Resonance (NMR Analysis)

Nuclear magnetic resonance spectra ($^1$H NMR and $^{13}$C NMR) were determined using an NMR spectrometer (Varian Inova 500 MHz NMR spectrometer equipped with an inverse probe head, with the NMR sample held at 25° C.).

PREPARATIVE EXAMPLES

Preparative Example 1—Synthesis of N-Benzylmethylamine Hydrochloride (BMAC)

In a glass vial with a magnetic stir bar, N-Benzylmethylamine (1.21 g, 0.0100 mol) was dissolved in ethanol (10.0 mL). Concentrated hydrochloric acid (0.60 mL, 0.0105 mol) was added dropwise while vigorously stirring the solution. The reaction was placed in a freezer at −10° C. overnight. The white precipitate that formed was isolated via vacuum filtration and washed with cold ethanol. Mass recovered: 0.98 g (61.8% yield). Chemical structure was confirmed using $^1$H and $^{13}$C NMR.

Preparative Example 2—N-Benzylmethylammonium Trifluoroacetate (BMATFA)

In a glass vial with a magnetic stir bar, N-Benzylmethylamine (1.21 g, 0.0100 mol) and anhydrous trifluoroacetic acid (1.14 g, 0.0100 mol) were combined with vigorously stirring. There was a moderate exotherm upon addition of the acid, and the resulting clear liquid was light orange in color. Mass recovered: 2.35 g (quantitative).

Preparative Example 3—N-Benzylmethylamine Toluenesulfonic Acid (BMATSA)

In a glass vial with a magnetic stir bar, N-Benzylmethylamine (1.21 g, 0.0100 mol) was dissolved in ethanol (5.0 mL). p-toluenesulfonic acid monohydrate (1.90 g, 0.0100 mol) was dissolved in ethanol (5.0 mL) and the acid solution was added slowly to the amine solution with vigorous stirring. The reaction was placed in a freezer at −10° C. overnight. The white precipitate that formed was isolated via vacuum filtration and washed with cold ethanol. Mass recovered: 2.85 g (97.2% yield). Chemical structure was confirmed using 41 and $^{13}$C NMR.

Preparative Example 4—m-Xylylenediamine Dihydrochloride (MXDA-2HCl)

In a glass vial with a magnetic stir bar, m-Xylylenediamine (1.36 g, 0.0100 mol) was dissolved in ethanol (10.0 mL). Concentrated hydrochloric acid (1.20 mL, 0.021 mol) was added dropwise while vigorously stirring the solution.

The reaction was placed in a freezer at −10° C. overnight. The white precipitate that formed was isolated via vacuum filtration and washed with cold ethanol. Dissolving the isolated solid in deionized water gave no change in pH, indicating no free acid was present. Mass recovered: 2.08 g (quantitative yield).

EXAMPLES

To begin our investigation a model simple system, Ph-a benzoxazine (made from phenol, aniline, and two equivalents of formaldehyde, melting point near 40° C.) was melt blended with a series of ethyl ammonium salts at 50° C. with Ph-a at a molar ratio of 10 equivalents of benzoxazine material to 1 equivalent of salt.

Comparative Example 1 (CE-1)

A 2.11 gram (10.0 mmol) sample of Ph-a was heated to 50° C. to melt and stirred while cooling to room temperature in order to mimic the thermal history of other examples. A small aliquot was analyzed by DSC and the results were as tabulated in Table 2.

Example 1 (Ex-1)

2.11 grams (10.0 mmol) of Ph-a were mixed with 0.08 grams (1.0 mmol) of EAC at 50° C. and stirred while cooling to room temperature until a uniform paste was obtained. A small aliquot was analyzed by DSC and the results were as tabulated in Table 2.

Example 2 (Ex-2)

2.11 grams (10.0 mmol) of Ph-a were mixed with 0.14 grams (1.00 mmol) of TEAC at 50° C. and stirred while cooling to room temperature until a uniform paste was obtained. A small aliquot was analyzed by DSC and the results were as tabulated in Table 2.

Example 3 (Ex-3)

2.11 grams (10.0 mmol) of Ph-a were mixed with 0.11 grams (1.00 mmol) of DEAC at 50° C. and stirred while cooling room temperature until a uniform paste was obtained. A small aliquot was analyzed by DSC and the results were as tabulated in Table 2.

TABLE 2

|  | Benzoxazine (mol. eq.) | Amine salt (mol. eq.) | Onset Temp, ° C. | Peak Temp, ° C. | Total Heat Released, J/gram |
| --- | --- | --- | --- | --- | --- |
| CE-1 | Ph-a | none | 204 | 219 | 339 |
| Ex-1 | Ph-a (10 eq) | EAC (1 eq) | 179 | 203 | 430 |
| Ex-2 | Ph-a (10 eq) | TEAC (1 eq) | 167 | 195 | 359 |
| Ex-3 | Ph-a (10 eq) | DEAC (1 eq) | 153 | 189 | 404 |

The data in Table 2 showed that in all cases there was a reduction in the peak temperature of the polymerization exotherm when the amine salt was present. It was also observed that there was lack of an exothermic peak near 100° C. Comparing the three salt containing examples, DEAC as the amine salt component offered the lowest peak and onset temperatures. The over all trend in peak reaction temperature was EAC>TEAC>DEAC. This trend followed a general basicity trend for aliphatic amines, wherein secondary amines tend to be more basic than primary amines (for electronic reasons) and more basic than tertiary amines (due to the steric hindrance of tertiary amines).

DEAC was chosen as a representative curative and the ratio of benzoxazine to curative (i.e., amine salt) was systematically varied to interrogate stoichiometrc effects. In Examples 4 to 6, samples with molar ratios of 1:1, 5:1, and 20:1 (molar ratio of benzoxazine to amine salt) were prepared and evaluated by DSC.

Example 4 (Ex-4)

2.11 grams (10.0 mmol) of Ph-a were mixed with 1.09 grams (10.0 mmol) of DEAC at 50° C. and stirred while cooling to room temperature until a uniform paste was obtained. A small aliquot was analyzed by DSC and the results were as tabulated in Table 3.

Example 5 (Ex-5)

2.11 grams (10.0 mmol) of Ph-a were mixed with 0.22 grams (2.00 mmol) of DEAC at 50° C. and stirred while cooling to room temperature until a uniform paste was obtained. A small aliquot was analyzed by DSC and the results were as tabulated in Table 3.

Example 6 (Ex-6)

4.22 grams (20.0 mmol) of Ph-a were mixed with 0.11 grams (1.00 mmol) of DEAC at 50° C. and stirred while cooling room temperature until a uniform paste was obtained. A small aliquot was analyzed by DSC and the results were as tabulated in Table 3.

TABLE 3

|  | Benzoxazine (mol. eq.) | Amine salt (mol. eq.) | Onset Temp, ° C. | Peak Temp. ($2^{nd}$ Peak), ° C. | Total Heat Released, J/gram |
| --- | --- | --- | --- | --- | --- |
| Ex-4 | Ph-a (1 eq) | DEAC (1 eq) | 135 | 153 (200) | 207 |
| Ex-5 | Ph-a (5 eq) | DEAC (1 eq) | 136 | 158 (192) | 386 |
| Ex-6 | Ph-a (20 eq) | DEAC (1 eq) | 136 | 181 | 415 |

The data in Table 3 reflected a bimodal exotherm that occurred from 120-250° C. In other test samples (data not shown), the relative intensity of the first and second peaks could be manipulated by varying the stoichiometry and the exact position of the initial exothermic peak shifted to lower temperature as the salt loading increases. However, the total heat released during the exothermic events scaled well with the mass fraction of the mixture that was benzoxazine, which suggested that the salt itself was not likely to be decomposing or reacting with itself and contributing to the overall exotherm observed.

To interrogate the effect of the acid used to make the amine salt, a transition was made to salts formed by the neutralization of various Bronsted acids with N-benzylmethylamine. The switch in amine was made in order to retain the desirable secondary amine character of the curative, and add aromatic components that can potentially react and be enchained into the developing polymer network. Three salts were synthesized from N-benzylmethylamine and hydrochloric acid, trifluoroacetic acid and p-toluene sulfonic acid. These salts were mixed in to Ph-a benzoxazine at a 10:1 molar ratio and evaluated by DSC.

Example 7 (Ex-7)

2.11 grams (10.0 mmol) of Ph-a were mixed with 0.16 grams (1.0 mmol) of BMAC at 50° C. and stirred while cooling to room temperature until a uniform paste was obtained. A small aliquot was analyzed by DSC and the results were as tabulated in Table 4.

Example 8 (Ex-8)

2.11 grams (10.0 mmol) of Ph-a were mixed with 0.29 grams (1.0 mmol) of BMATSA at 50° C. and stirred while cooling to room temperature until a uniform paste was obtained. A small aliquot was analyzed by DSC and the results were as tabulated in Table 4.

Example 9 (Ex-9)

4.22 grams (20.0 mmol) of Ph-a were mixed with 0.24 grams (1.0 mmol) of BMATFA at 50° C. and stirred while cooling room temperature until a uniform paste was obtained. A small aliquot was analyzed by DSC and the results were as tabulated in Table 4.

TABLE 4

|  | Benzoxazine (mol. eq.) | Amine salt (mol. eq.) | Onset Temp, ° C. | Peak Temp. ($2^{nd}$ Peak), ° C. | Total Heat Released, J/gram |
| --- | --- | --- | --- | --- | --- |
| Ex-7 | Ph-a (10 eq) | BMAC (1 eq) | 123 | 151 (189) | 393 |
| Ex-8 | Ph-a (10 eq) | BMATSA (1 eq) | 136 | 187 | 388 |
| Ex-9 | Ph-a (10 eq) | BMATFA (1 eq) | 115 | 161 (189) | 375 |

Comparing the three results in Table 4, it can be seen that they all displayed two strong overlapping exothermic peaks, one near 150° C. and a second around 190° C. The salt with trifluoroacetic acid also displayed a small exotherm near 100° C. that overlapped with the onset of the first major peak. The overall onset of the polymerization exotherms once again paralleled the relative basicity of the counterions. Trifluoroacetate tended to be the most basic (largest pKa value) of the three counterions studied and it showed the lowest onset of polymerization followed by chloride, and lastly p-toluenesulfonate. The observation that both changes in the amine component and the acid component of the curative followed the same reactivity trend raised a question of which component contributed most significantly to the overall reduction in polymerization temperature.

To further explore the role(s) of the components, we investigated the polymerization of Ph-a with BMATSA and each independent component, N-benzylmethyl amine or p-toluenesulfonic acid. Mixtures were made at constant mole ratio of benzoxazine to curative of 10:1 and each of the three mixtures were evaluated by DSC.

Comparative Example 2 (CE-2)

2.11 grams (10.0 mmol) of Ph-a were mixed with 0.19 grams (1.0 mmol) of p-toluenesulfonic acid monohydrate at 50° C. and stirred while cooling to room temperature until a uniform paste was obtained. A small aliquot was analyzed by DSC and the results are tabulated in Table 5.

Comparative Example 3 (CE-3)

2.11 grams (10.0 mmol) of Ph-a were mixed with 0.12 grams (1.0 mmol) of N-benzylmethylamine at room temperature until a homogeneous solution was obtained. A small aliquot was analyzed by DSC and the results are tabulated in Table 5.

TABLE 5

|  | Benzoxazine (mol. eq.) | Curative (mol. eq.) | Onset Temp, ° C. | Peak Temp. ($2^{nd}$ Peak), ° C. | Total Heat Released, J/gram |
| --- | --- | --- | --- | --- | --- |
| Ex-8 | Ph-a (10 eq) | BMATSA (1 eq) | 136 | 187 | 388 |
| CE-2 | Ph-a (10 eq) | p-toluenesulfonic acid (1 eq) | 136 (73) | 189 (105) | 388 |
| CE-3 | Ph-a (10 eq) | N-benzylmethylamine (1 eq) | 197 (80) | 216 (102) | 290 |

Looking at the data in Table 5 for Ph-a with N-benzylmethylamine (CE-3), it was surprising that the main polymerization exotherm was almost identical to neat benzoxazine (CE-1). For CE-3, there was a very weak exothermic peak at 102° C., which corresponded to the expected first exothermic event for the amine cure of benzoxazines, but this was a minor fraction of the total energy released over the course of the experiment. This suggested that the amine components was a minor contributor the overall reduction in the polymerization temperature.

Looking to the data in Table 5 that corresponded top-toluenesulfonic acid (CE-2) as a curative, two broad exothermic events are evident with maxima occurring at 105° C. and 189° C. Comparing the CE-2 trace to the Ex-8 trace it can be seen that the exothermic peaks that occur between 185° C. and 190° C. have a similar shape, however the amine salt gave a slightly less broad peak. These results taken together suggested that the amine salt curative provided a convenient way to deliver an acid-like benzoxazine cure with more control over exothermic peak shape and temperature.

Extending from Ph-a benzoxazine to the commercially available BisA-a benzoxazine, we investigated the effect of DEAC and a difunctional amine salt MXDA-2HCl on the polymerization of benzoxazines. Table 6 is a summary of the DSC results of BisA-a benzoxazine in the presence of amine salts.

Comparative Example 4 (CE-4)

A 2.31 gram (5.0 mmol) sample of BisA-a was heated to 120° C. to melt and stirred while cooling to room temperature in order to mimic the thermal history of other examples. A small aliquot was analyzed by DSC and the results were tabulated in Table 6.

Example 10 (Ex-10)

2.31 grams (5.0 mmol; 10 mmol benzoxazine equivalents) of BisA-a were mixed with 0.11 grams (1.0 mmol) of DEAC at 120° C. and stirred while cooling to room temperature until a uniform paste was obtained. A small aliquot was analyzed by DSC and the results were tabulated in Table 6.

Example 11 (Ex-11)

2.31 grams (5.0 mmol; 10 mmol benzoxazine equivalents) of BisA-a were mixed with 0.10 grams (0.50 mmol) of MXDA-2HCl at 120° C. and stirred while cooling to room temperature until a uniform paste was obtained. A small aliquot was analyzed by DSC and the results were tabulated in Table 6.

Example 12 (Ex-12)

2.31 grams (5.0 mmol; 10 mmol benzoxazine equivalents) of BisA-a were mixed with 0.12 grams (0.50 mmol) of DBU-Ph at 120° C. and stirred while cooling to room temperature until a uniform paste was obtained. A small aliquot was analyzed by DSC and the results were tabulated in Table 6.

TABLE 6

|  | Benzoxazine (mol. eq.) | Amine salt (mol. eq.) | Onset Temp, ° C. | Peak Temp. ($2^{nd}$ Peak), ° C. | Total Heat Released, J/gram |
| --- | --- | --- | --- | --- | --- |
| CE-4 | BisA-a | none | 243 | 253 | 342 |
| Ex-10 | BisA-a (10 eq) | DEAC (1 eq) | 185 | 212 | 354 |
| Ex-11 | BisA-a (10 eq) | MXDA-2HCl (1 eq) | 185 | 210 | 292 |
| Ex-12 | BisA-a (10 eq) | DBU-Ph (1 eq) | 161 | 190 (229) | 365 |

From the data in Table 6 it was observed that using DEAC (Ex-10) or MXDA-2HCl (Ex-11) each resulted in successfully lower the peak temperature of the polymerization relative to the comparative example without added amine salt (CE-4).

Lastly, a preliminary investigation into the kinetics of polymerization was undertaken, using aliquots from CE-4 and Ex-10 and analyzing by DSC using variable heating rates to determine activation energy for polymerization. One important parameter for understanding the polymerization reaction and mechanism of benzoxazines is the activation energy ($E_a$) for the polymerization reaction. Two commonly used methods for estimating the $E_a$ are known as the Kissinger and Ozawa methods. Both models use non-isothermal DSC measurements at various heating rates to estimate the $E_a$ of an observed thermal event (see Hamerton, I., et al., Macromolecules, 2013(46), 5117-5132).

TABLE 7

|  | Heating Rate (° K/min) | Peak Temp. (° K) | Activation Energy - Kissinger (kJ/mole) | Activation Energy - Ozawa (kJ/mole) |
| --- | --- | --- | --- | --- |
| CE-4 | 2.00 | 481.90 | 84.32 | 87.93 |
|  | 5.00 | 502.06 |  |  |
|  | 8.00 | 512.65 |  |  |
|  | 10.00 | 517.33 |  |  |
|  | 15.00 | 526.85 |  |  |
| Ex-10 | 2.00 | 452.60 | 87.59 | 90.54 |
|  | 5.00 | 470.89 |  |  |
|  | 8.00 | 476.88 |  |  |
|  | 10.00 | 485.04 |  |  |
|  | 15.00 | 489.80 |  |  |

Using the obtained DSC data and plotting the inverse of the observed peak temperature of the polymerization exotherm against the natural log of the heating rate ((3) according to the Kissinger and Ozawa methods yielded estimates of the activation energy for polymerization. For the obtained data, the $E_a$ obtained by the Kissinger method was 87.59 kJ/mole and by the Ozawa method $E_a$=90.54 kJ/mole. Using the same methodology for the polymerization of the neat BisA-a benzoxazine $E_a$ values of 84.32 kJ/mole and 87.93 kJ/mole were obtained for the Kissinger and Ozawa methods, respectively. The $E_a$ values for the catalyzed and un-catalyzed reactions were remarkably similar, which suggested that the rate limiting step of the polymerization under both conditions was the same even though the temperature at which the polymerization was observed was reduced in the presence of the amine salt.

What is claimed is:

1. A polymerizable composition comprising:
   a) a benzoxazine, and
   b) a catalyst comprising an alkylammonium salt of an acid having a pKa in acetonitrile of ≥9,
   wherein the alkylammonium salt is of the formula $R^{11}R^{12}R^{13}N^+H$ $X^-$, where each of $R^{11}$ and $R^{12}$ are independently an alkyl or aryl groups, and $R^{13}$ is H, an alkyl or an aryl, wherein at least one of $R^{11}$, $R^{12}$, $R^{13}$ is an alkyl group, and wherein $X^-$ is the conjugate base of an acid having a pKa in acetonitrile of ≥9.

2. The polymerizable composition of claim 1 wherein $X^-$ is the conjugate base of nitric acid, acetic acid, trifluoroacetic acid, benzoic acid, salicylic acid, succinic acid, oxalic acid, phenol, 4-nitrophenol, or picric acid.

3. The polymerizable composition of claim 1 further comprising a toughening agent.

4. The polymerizable composition of claim 1, further comprising a film forming polymer or oligomer.

5. The polymerizable composition of claim 4, wherein the film-forming polymer is in an amount of 1 to 75 wt %, relative to the benzoxazine.

6. The polymerizable composition of claim 1 further comprising an epoxy resin.

7. The polymerizable composition of claim 1, further comprising a reactive diluent.

8. The polymerizable composition of claim 7 wherein the reactive diluent is of the formula:
   $R^8$—$(ZH)_p$, where
   $R^8$ is a (hetero)hydrocarbyl group,
   Z is a mixture of —S— or —$NR^9$, where each $R^9$ is H or a hydrocarbyl group, and
   p is 1 to 6.

9. The polymerizable composition of claim 8, wherein the ratio of the sum of amine and/or thiol groups from the compound $R^8$—$(ZH)_p$, to the benzoxazine groups is about 3:1 to 100:1.

10. A polymerized composition comprising a polymerized product of the polymerizable composition of claim 1, which comprises one or more polymers of the formula:

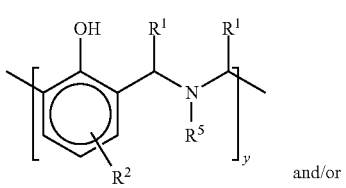

III and/or

-continued

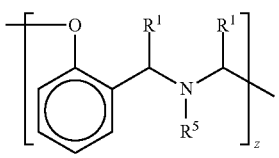

IV each R¹ is H or an alkyl group, and is the residue of an aliphatic aldehyde,
R² is H, a covalent bond, or a polyvalent (hetero)hydrocarbyl group;
R⁵ is the (hetero)hydrocarbyl residue of a primary amino compound, $R^5(NH_2)_m$, where m is 1-4; and
y+z is at least 2, and
the residue of the catalyst.

11. The polymerized composition of claim 10, wherein R⁵ is a poly(alkyleneoxy) group.

12. The polymerized composition of claim 10, wherein R⁵ comprises a mixture of aryl groups and aliphatic groups.

13. A polymerizable composition comprising:
    a) a benzoxazine, and
    b) a catalyst comprising an alkylammonium salt of an acid having a pKa in acetonitrile of ≥9
    wherein the alkylammonium salt is derived from a secondary amine.

14. A polymerizable composition comprising:
    a) a benzoxazine, and
    b) a catalyst comprising an alkylammonium salt of an acid having a pKa in acetonitrile of ≥9,
    wherein the alkylammonium salt is derived form a tertiary amine.

* * * * *